United States Patent [19]
Kreitzberg

[11] Patent Number: 5,248,020
[45] Date of Patent: Sep. 28, 1993

[54] DRIVE SYSTEM FOR A TRACTOR

[75] Inventor: Ernest A. Kreitzberg, Willow Springs, Ill.

[73] Assignee: Case Corporation, Racine, Wis.

[21] Appl. No.: 855,080

[22] Filed: Mar. 23, 1992

[51] Int. Cl.⁵ .................. B60K 17/348; B60K 23/08
[52] U.S. Cl. ........................... 180/244; 180/197; 180/249; 192/13 R; 192/0.082
[58] Field of Search ............. 180/244, 247, 197, 293, 180/292, 249, 248, 250; 192/13 R, 0.082

[56] References Cited

U.S. PATENT DOCUMENTS

| | | | |
|---|---|---|---|
| 4,466,519 | 8/1984 | Römer | 180/244 |
| 4,747,462 | 5/1988 | Herrmann et al. | 180/233 |
| 4,753,312 | 6/1988 | Burgdorf et al. | 180/244 |
| 4,811,811 | 3/1989 | Bergene | 180/244 |
| 4,878,559 | 11/1989 | Moon et al. | 180/244 |
| 4,951,775 | 8/1990 | Kittle et al. | 180/244 |
| 4,991,679 | 2/1991 | Fujii et al. | 180/247 |
| 5,012,884 | 5/1991 | Sato | 180/247 |
| 5,044,458 | 9/1991 | Schwarz et al. | 180/247 |

FOREIGN PATENT DOCUMENTS 256036 11/1987 Japan .................. 180/247

Primary Examiner—Margaret A. Focarino
Assistant Examiner—Kevin Hurley
Attorney, Agent, or Firm—Rudnick & Wolfe

[57] ABSTRACT

A drive system for a tractor which is operable in either a two wheel or a four wheel mode of operation. The drive system includes a control apparatus which automatically establishes a drive connection between a power source on the tractor and a front pair of tractor wheels through regulated operation of a normally engaged clutch assembly in response to application of service brakes on the tractor. Thus, the decreasing inertia of the power source, inherent with deceleration due to braking, is utilized to substantially equalize wheel slippage between front and rear pairs of wheels thereby advantageously improving braking performance especially as the tractor operates at relatively high speeds.

16 Claims, 3 Drawing Sheets

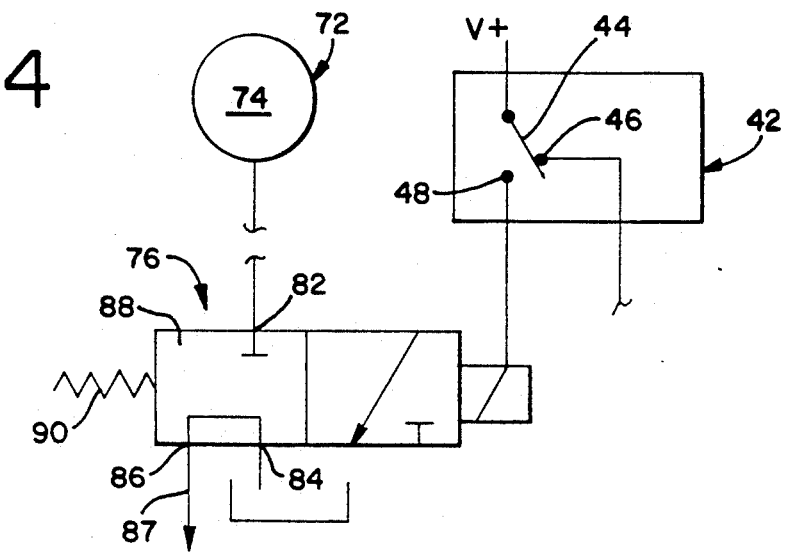
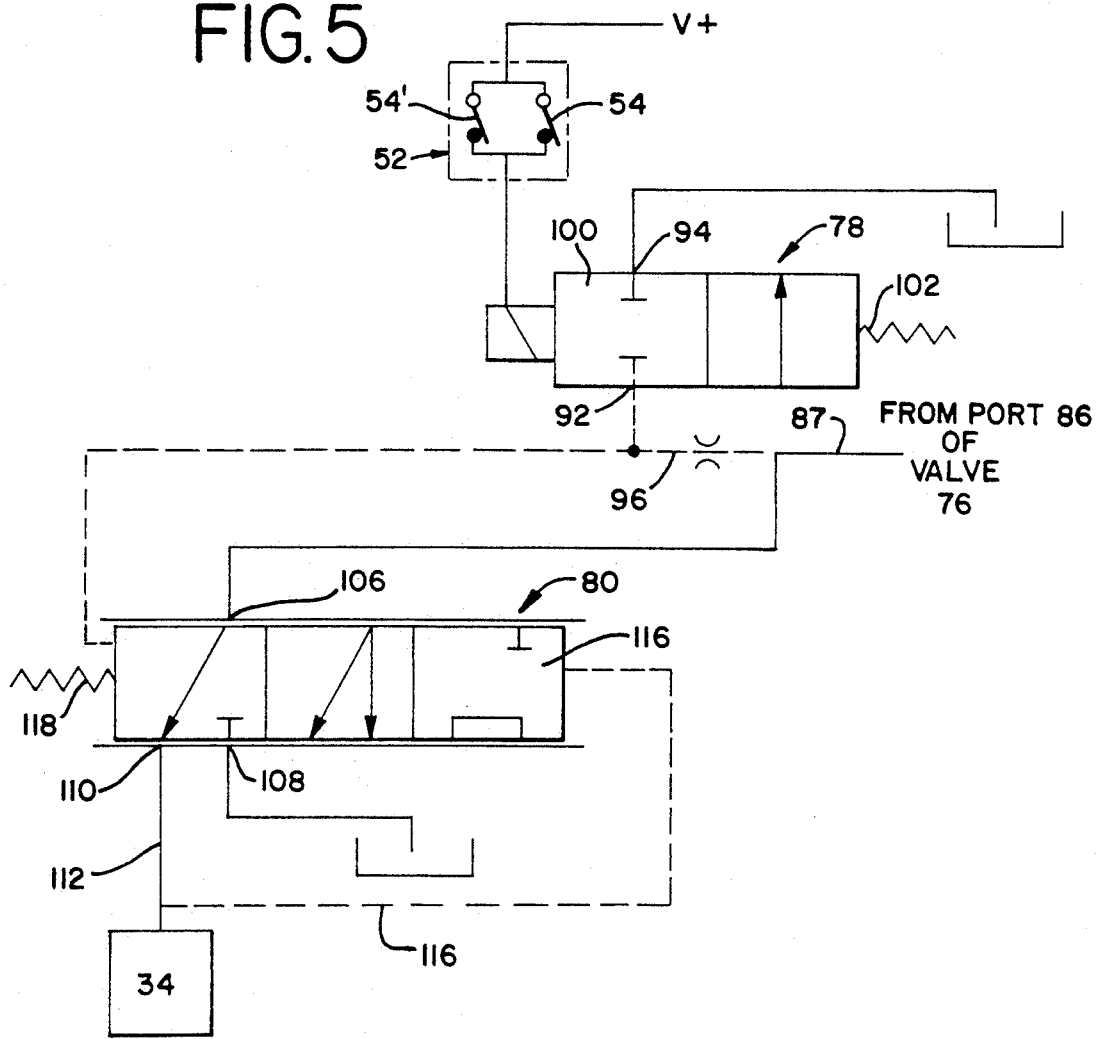

DRIVE SYSTEM FOR A TRACTOR

FIELD OF THE INVENTION

The present invention generally relates to agricultural equipment such as tractors and the like and, more particularly, to a tractor having a constantly driven rear axle and a front axle which is selectively coupled with the rear axle to improve handling characteristics during tractor deceleration.

BACKGROUND OF THE INVENTION

Farm tractors typically operate in a two wheel or a four wheel mode of operation. When pulling heavy agricultural equipment through a field, it is often beneficial to utilize a four wheel mode of operation. In other circumstances, such as travel over highways and the like, it is beneficial to condition the tractor in a two wheel mode of operation. Agricultural tractors which automatically disengage the four wheel drive when the tractor ground speed exceeds nine miles per hour are known in the art. On the other hand, four wheel assisted braking for relatively high speed (greater than nine miles per hour) tractors is required in Europe. European standards further require that the tractor default into a four wheel drive condition.

From published German patent DE No. 2,946,477, it is known to engage a front wheel drive clutch on a tractor to transmit power to a front axle when the service brakes for the rear axle are applied. As will be appreciated, however, engagement of the front wheel drive clutch in response to brake application can cause some tractor handling problems when the brakes are applied at high speeds. Known tractor control systems which, in response to tractor braking, lock the clutch assembly to transfer full power to the front wheels as the tractor operates at relatively high speeds creates a condition analogous to locking up the brakes on an automobile. The handling problems inherent with such situations are well known.

Application of the front wheel drive clutch is further complicated in tractors wherein it is often advantageous to use only one of the left or right brakes to assist in steering the tractor through a headland turnaround. With the front wheel drive clutch engaged during a brake-assisted steering operation, more braking effort is required, and front tire pushing, skidding, and wear is likewise increased.

Thus, there is a need and a desire for a drive system which improves braking performance of the tractor especially in cases where the tractor is operated in a two wheel mode of operation and at relatively high speeds (in excess of nine miles per hour).

SUMMARY OF THE INVENTION

In view of the above, and in accordance with the present invention, there is provided a drive system which allows the tractor to be conditioned for a two wheel mode of operation and which automatically shifts the tractor into a four wheel drive mode of operation in response to application of service brakes on the tractor. The drive system of the present invention includes a clutch assembly disposed to couple a front pair of wheels to a power source on the tractor. The drive system of the present invention includes a control apparatus which regulates operation of the clutch assembly. Upon application of the service brakes, the clutch assembly is engaged in a controlled manner such that decreasing inertia of the tractor power source, inherent with deceleration of the tractor, is utilized to substantially equalize the wheel slippage between front and rear pairs of wheels on the tractor thereby advantageously improving braking performance of the tractor especially at high speeds (in excess of 9 mph).

In the preferred form of the invention, the control apparatus includes electro/hydraulic circuitry for controlling operation of the clutch assembly which is responsive to hydraulic pressure provided thereto. In a preferred form of the invention, the clutch assembly operates in a normally engaged condition and the operator must positively act to change the tractor from a four wheel drive mode to a two wheel drive mode. A brake switch assembly, preferably including first and second switches operatively coupled to the service brakes on the tractor, is interfaced with the control apparatus. Moreover, an operator settable mode switch assembly conditions the tractor for a two wheel or four wheel mode of operation as a function of the position of an actuator.

The electro/hydraulic circuitry of the control apparatus includes a series of valves interposed between a pressurized fluid source arranged on the tractor and the clutch assembly for controlling the level of clutch assembly engagement. One of the valves which controls fluid flow to the clutch assembly is a proportional valve which is responsive to fluid pressure differentials applied thereagainst. In one position, the proportional valve permits full pressurized fluid flow from the pressurized fluid source to the clutch assembly thereby fully disengaging the clutch assembly. In a second position, the proportional valve connects the clutch assembly to exhaust thereby fully engaging the clutch assembly. Alternatively, the proportional valve regulates fluid flow to the clutch assembly whereby allowing a predetermined level of torque which is less than full engagement to be applied to the clutch assembly when the proportional valve is positioned between its first and second positions.

The control apparatus of the present invention is configured to automatically return the tractor to a two wheel mode of operation after the service brake is released. Moreover, the control apparatus includes logic circuitry which automatically shifts the tractor into a four wheel mode of operation in response to electrical/hydraulic failure.

The drive system of the present invention is responsive to an ON/OFF switch which controls overall operation of the tractor. Moreover, the drive system further includes means for providing an indication to the operator whether the tractor is conditioned for a two wheel or a four wheel mode of operation.

With the present invention, the control apparatus automatically regulates the level of engagement of the clutch assembly. When the tractor is operated in a two wheel mode of operation, the clutch assembly is ineffective to transfer power to the front steering wheels of the tractor. When the service brakes are applied, the level of clutch assembly engagement is regulated to effect the transfer power to the front wheels through the tractor power source. By the above arrangement, no additional service brakes are required on the front axle of the tractor to facilitate a four wheel braking operation through use of the reduced inertia of the power source thereby maintaining steering control during deceleration of the tractor. Moreover, the tractor is automatically returned to a two wheel mode of operation upon release of the brakes.

Numerous other features and advantages of the present invention will become readily apparent from the following detailed description, the accompanying drawings, and the appended claims.

BRIEF DESCRIPTION OF THE DRAWINGS

FIG. 4 is an enlarged schematic illustration of an electro/hydraulic valve associated with the present invention; and FIG. 5 is an enlarged schematic illustration of additional valve structure associated with the present invention.

DETAILED DESCRIPTION OF A PREFERRED EMBODIMENT

Figure 1:
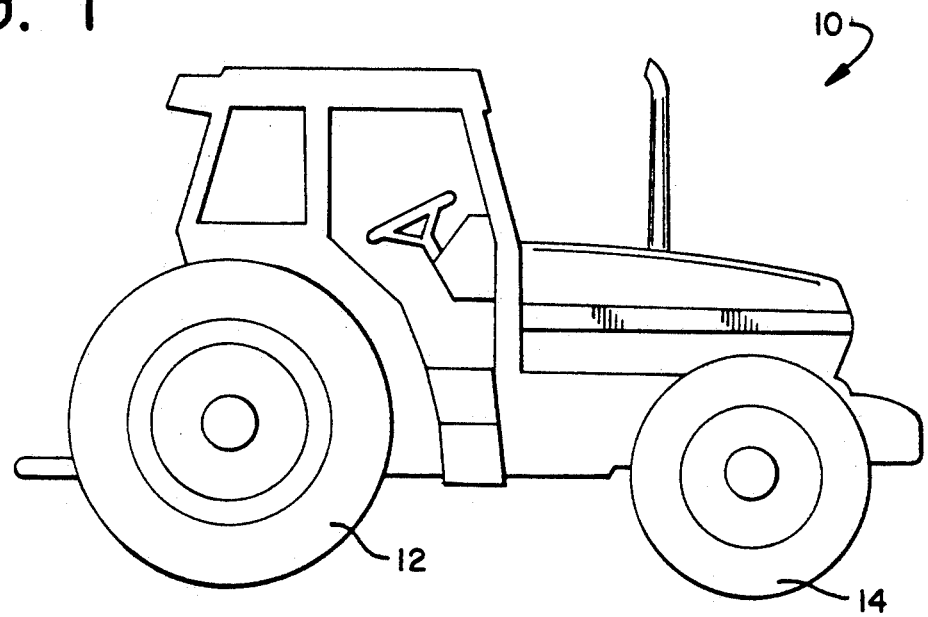
FIG. 1 is a side elevational view of one form of agricultural implement to which the present invention may be applied.

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Figure 2:
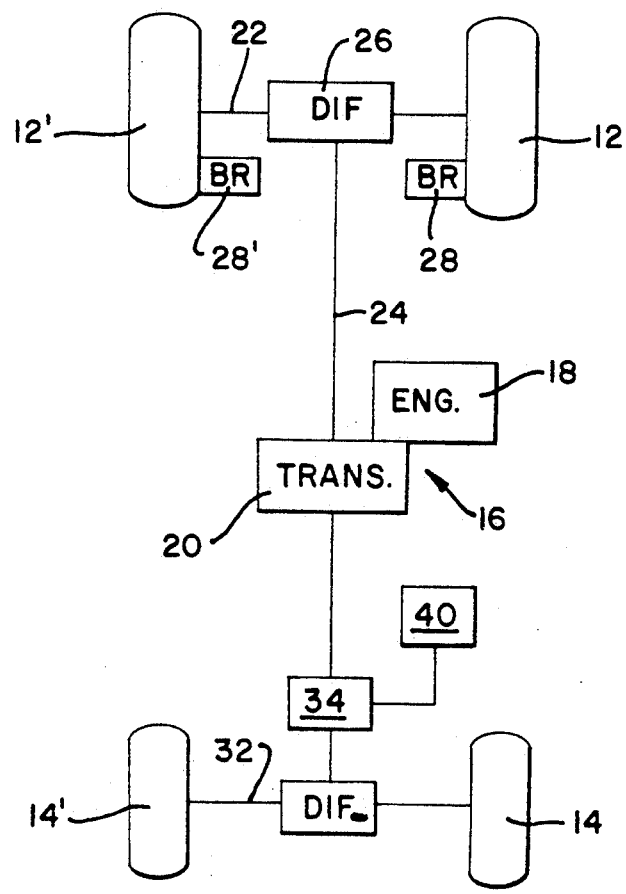
FIG. 2 is a schematic diagram of the implement shown in FIG. 1.

Referring now to the drawings, wherein like reference numerals indicate like parts throughout the several views, the present invention is embodied in a tractor 10. Tractor 10 includes a pair of rear drive wheels 12, 12' of a predetermined diameter and a pair of front wheels 14, 14' having a diameter somewhat smaller than the predetermined diameter of the rear wheels. Notably, the front pair of wheels 14, 14' are steerable to provide the tractor 10 with direction. As shown in FIG. 2, tractor 10 further includes a power source 16 comprised of a conventional engine 18 and transmission 20 combination. Transmission 20 drives a rear axle 22 through a drive shaft 24 and differential 26. The rear or primary axle 24 supports the rear primary pair of drive wheels 12, 12'.

Drive wheels 12, 12' on the tractor are provided with service brakes 28, 28', respectively. The service brakes 28, 28' are of the conventional design and are independently operable from a cab region of the tractor as by brake pedals (not shown) to allow either service brake to be independently applied to assist in turning the tractor. During highway operation of the tractor, the brake pedals are typically connected to each other through a conventional coupler whereby movement of either brake pedal will conjointly affect actuation of the service brakes 28, 28'.

The power source 16 also drives a front axle 32 and thereby the front wheels 14, 14'. The front wheels 14, 14' are powered through operation of a clutch assembly 34. The clutch assembly 34 can take many forms including mechanical, pneumatic, hydraulic, or electric. Preferably, a conventional spring engaged fluid pressure operated multi-disk clutch is utilized to selectively transfer power between power source 16 and front wheels 14, 14'. Notably, clutch assembly 34 is normally engaged to condition the tractor for a four wheel mode of operation.

Figure 3:
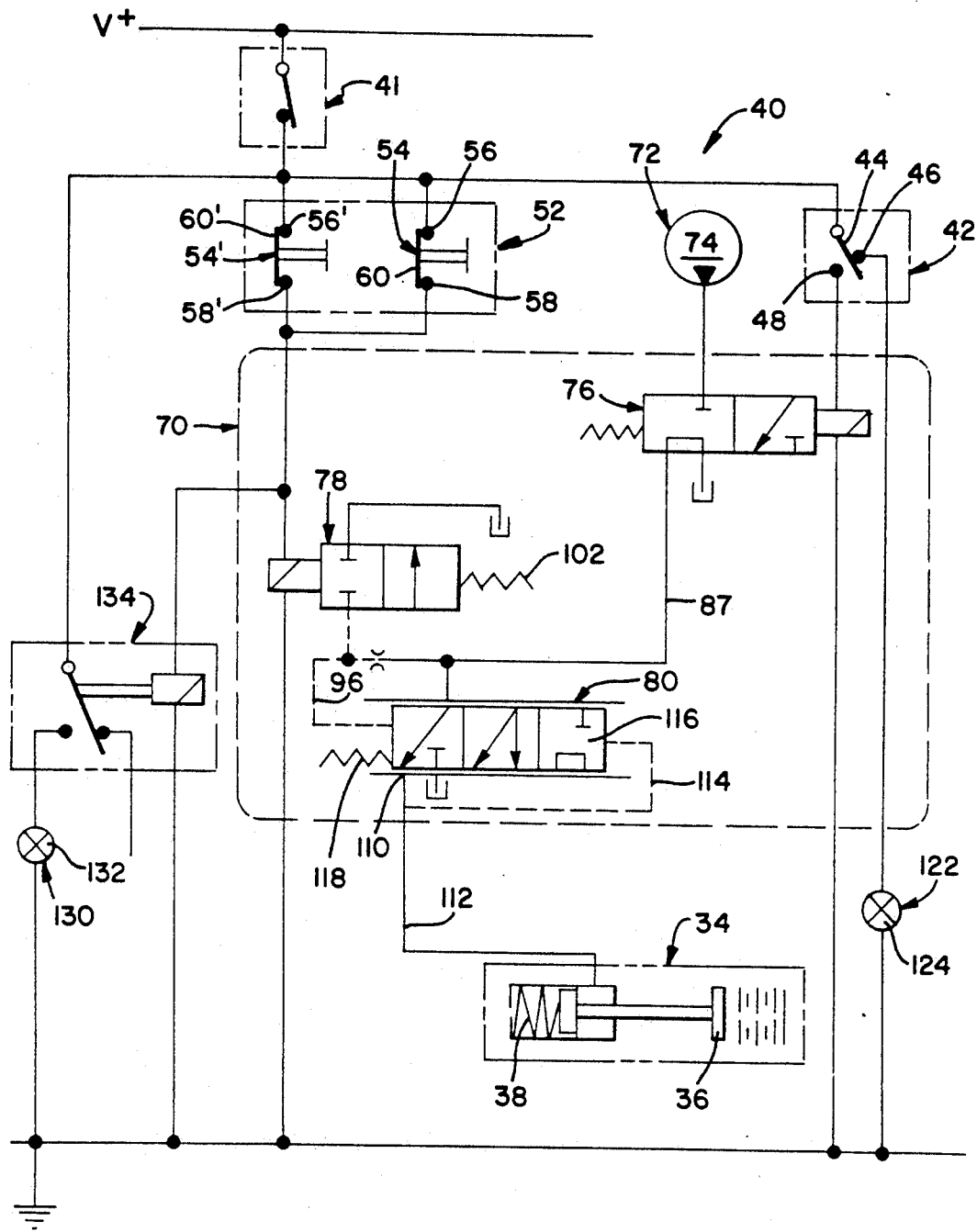
FIG. 3 is a schematic diagram of a drive system constructed according to the present invention.

As shown in FIG. 3, clutch assembly 34 includes a clutch actuator 36 which is normally biased into an engaged position under the influence of a spring or other suitable biasing means 38. Spring 38 applies a sufficient force to the actuator 36 to enable full output torque of the power source 16 to be transferred through the clutch assembly 34 to the front axle 32. In the illustrated embodiment, clutch assembly 34 is released in response to the application of fluid pressure in a direction opposed to the force developed by spring 38.

The normally engaged clutch assembly 34 forms part of a drive system 40 which selectively conditions the tractor 10 for a two wheel or four wheel mode of operation. As shown in FIG. 3, drive system 40 is enabled through a master ON/OFF switch assembly 41 connected to an electrical power source V+ such as the tractor battery. Drive system 40 further includes an operator settable mode switch assembly 42. Mode switch assembly 42 operates as a two position switch and includes an actuator 44 which is connected to the power source V+ through switch assembly 41. Switch assembly 42 further includes a first terminal 46 and a second terminal 48. Actuator 44 is normally biased toward terminal 46 which conditions the tractor to operate in a four wheel drive mode of operation. Notably, the operator is required to shift actuator 44 into contact with terminal 48 which, as will be described, conditions the tractor for two wheel operation.

Drive system 40 also includes a brake switch assembly 52. Brake switch assembly 52 includes first and second brake switches 54 and 54' operatively coupled to the service brakes 28, 28', respectively, of the tractor. Brake switch 54 has a first terminal 56 which is connected to the power source V+ through switch assembly 41, a second terminal 58, and a switch element 60 which closes the brake switch 54 as long as service brake 28 is released. Similarly, brake switch 54' has a first terminal 56' connected to the power source V+ through switch assembly 41, a second terminal 58, and a switch element 60' which closes the brake switch 54' as long as service brake 28' is released. It is important to note that brake switches 54 and 54' are arranged in a parallel relationship relative to each other.

A salient feature of the drive system 40 of the present invention relates to a control apparatus 70 which, in the preferred embodiment, is responsive to the mode switch assembly 42 and brake switch assembly 52. In the illustrated embodiment, control apparatus 70 includes electro/hydraulic circuitry for controlling fluid flow to and thereby regulating engagement of the clutch assembly 34.

As shown in FIG. 3, control apparatus 70 includes a source of pressurized fluid 72 and valves 76, 78, and 80 for controlling the level of clutch assembly engagement. The pressurized fluid source 72 preferably takes the form of a pump assembly 74 which is driven in response to operation of engine 18 on the tractor.

As shown in FIG. 4, valve 76 is preferably configured as a two position electrically responsive solenoid valve which is responsive to the mode switch assembly 42. In the illustrated embodiment, valve 76 includes an inlet port 82 connected to the fluid supply source 72, an exhaust port 84, and an outlet port 86 which is connected to valve 80 through conduit 87. Whether outlet port 86 receives fluid from the pressurized fluid source 72 or opens to exhaust is influenced by a spring biased valve element 88.

In the illustrated embodiment, the valve element 88 is biased under the influence of biasing means 90 into a position wherein outlet port 86 is open to exhaust. When the actuator 44 of mode switch assembly 42 is switched into engagement with the two wheel drive mode terminal 48, valve 76 is energized. In its energized state, valve element 88 moves against the action of the biasing means 90 to a position wherein the inlet port 82 is joined to port 86 thus allowing a pressurized fluid flow across the valve 76 and toward valve 80.

As shown in FIG. 5, valve 78 is preferably configured as a two position electrically responsive solenoid valve which is responsive to the brake switch assembly 52. In the illustrated embodiment, valve 78 includes an inlet port 92 and an exhaust port 94. A pilot passage 96, branching off of conduit 87 and extending between valves 76 and 80, leads to inlet port 92. Notably, pilot passage 96 likewise opens and applies pilot pressure against valve 80. The flow of pressurized hydraulic fluid between ports 92 and 94, and thereby the pilot pressure acting on valve 80, is controlled by a spring biased valve element 100.

In the illustrated embodiment, valve element 100 of valve 78 is biased under the influence of biasing means 102. When the valve 78 is energized, valve element 100 moves against the action of the biasing means 102 into a closed position wherein the pilot passage 96 is closed from exhaust thus allowing pilot line pressure to be applied against valve 80. As will be appreciated, the valve 78 will remain energized if either brake switch 54 or 54' of switch assembly 52 is closed. Only after both brake switches 54 and 54' are open (indicative of application of both service brakes 28 and 28') will the valve element 100 move to the left under the influence of spring 102 thereby opening port 92 to exhaust and relieving the pilot pressure in line 96 acting to shift valve 80.

As shown, valve 80 is configured as a proportional valve which regulates the level of engagement of the clutch assembly 34. Valve 80 includes an inlet port 106, an exhaust port 108, and an outlet port 110. Inlet port 106 of valve 80 is connected as by conduit 87 to outlet port 86 of valve 76. Outlet port 110 is connected, via conduit 112, to clutch assembly 34. A pilot passage 114 branches conduit 112 and is directed against valve 80 to develop a force opposed to the pilot line pressure pilot line 96. Valve 80 further includes a valve element 116 whose position is influenced by fluid pressure differentials applied thereagainst by pilot line pressures in passages 96 and 114. For purposes to be described hereinafter, biasing means, preferably in the form of a spring which conjointly acts with the pilot pressure in pilot line 96 against valve elements 16.

Valve 80 is operable in numerous positions. In one position, valve 80 permits full pressurized fluid flow from source 72 to be applied against the clutch actuator 36 whereby releasing the clutch assembly 34 and inhibiting transfer of torque to the front wheels thus conditioning the tractor for two wheel drive operation. In another position, valve 80 connects the clutch assembly 34 to exhaust thereby allowing full engagement of the clutch assembly 34 thus enabling full torque of power source 16 to be transmitted to the front wheels and, thus, conditioning the tractor for four wheel operation. When positioned between its first and second positions, valve 80 regulates or proportions pressurized fluid flow to the clutch assembly thereby allowing a predetermined level of torque to be applied through the clutch assembly 34 to the front wheels 14, 14'.

As schematically illustrated in FIG. 3, drive system 40 is provided with an indicator 122 for providing a signal indicative of four wheel mode operation for the tractor. In the illustrated embodiment, indicator 122 is in the form of a light 124 arranged in the cab region of the tractor and which is powered in response to actuator 44 of the mode switch selector assembly 42 being positioned in contact with the four wheel drive terminal 46.

A brake signal indicator 130 is also provided as part of the drive system 40. Indicator 130 is preferably in the form of brake lights 132 connected to the power source V+ through a normally open relay 134. Relay 134 is energized in response to completion of a circuit as through brake switch assembly 52. Upon application of the service brakes 28, 28', relay 134 is deenergized, and the brake lights 132 are illuminated.

With the present invention, the operator must positively act to remove the tractor 10 from a four wheel drive condition. When actuator 44 of the mode switch assembly 42 is set to operate the tractor in a four wheel drive mode (selector 44 in contact with terminal 46), the flow of pressurized fluid to the clutch assembly 34 is interrupted such that the spring 38 conditions the clutch assembly 34 to operate in its normally engaged condition whereby power and torque are transferred to the front wheels 14, 14' from the power source 16. Thus, power is delivered to all four wheels 12, 12', 14, and 14' of the tractor.

When the operator desires two wheel operation of the tractor, actuator 44 on switch assembly 42 is moved into contact with the two wheel drive terminal 48. When switch assembly 42 is set in a two wheel mode, valve 76 is shifted thus allowing pressurized fluid flow from source 72 to pass through conduit 87 toward valve 80. As long as the service brakes 28, 28' (FIG. 1) remain released, valve 78 is conditioned to close pilot passage 96 from exhaust As the pressurized fluid flow continues toward valve 80, the combined action of spring 118 and the pilot pressure in pilot line 96 acts to shift proportional valve 80 such that actuating fluid from source 72 flows from the inlet port 106 to outlet port 110 and is applied to the clutch assembly 34. As will be appreciated, the pilot pressure in pilot line 114 is insufficient to prevent valve 80 from shifting to the right under the influence of pilot pressure in line 96 in combination with the pressure of spring 118. The magnitude of the pressurized fluid flow to the clutch assembly 34 from source 72 is sufficient to overcome the force of spring 38 acting against clutch actuator 36 thus allowing the clutch assembly 34 to be released. As will be appreciated, release of the clutch assembly 34 conditions the tractor to operate in a two wheel drive mode of operation.

The two wheel drive mode of operation of the tractor continues as long as the service brakes 28, 28' are not used to decelerate the tractor. Upon application of both service brakes 28, 28', valve 78 is de-energized and shifted under the influence of biasing means 102. In a shifted position, port 92 of valve 78 is open to exhaust. With port 92 of valve 78 open to exhaust, pilot line 96 likewise opens to exhaust thus reducing the pilot pressure acting against of the proportional valve 80. Thus, the differential pressures acting against valve 80 tend to shift valve element 116 of valve 80 to the left as shown in FIGS. 3 and 5. As long as the mode select switch assembly 42 is set in a two wheel mode, however, pressured fluid from source 72 is delivered to the proportional valve 80

As valve element 116 is shifted to the left, the fluid in clutch assembly 34 is rapidly exhausted due to the force applied to actuator 36 by the clutch spring 38. Rapid exhaustion of fluids allows engagement of the clutch assembly 34 in a small fraction of a second. Rapid movement of the valve element 116 continues until the clutch actuator 36 has achieved its full travel and enable transfer of partial output torque through the clutch assembly. Spring 118 then reacts to shift valve element 116 to a center or proportioning position thus preventing further loss of fluid and thereby inhibiting further pressure reduction in clutch assembly 34.

With valve element 116 shifted to a center or proportioning position, a regulated flow of pressurized fluid from source 72 is delivered across valve 80 and ultimately to the clutch assembly 34. During tractor deceleration, valve 80 is regulated under the influence of spring 118 balanced against the pressure in pilot line 114. The regulated operation of valve 80 establishes a drive connection between the power source 16 and the front wheels 14, 14' through regulated engagement of the clutch assembly 34 at a torque level which substantially equalizes wheel slippage between the front and rear pairs of wheels during braking of the implement. As will be appreciated, substantially equalizing wheel slippage between the front and rear pairs of wheels enhances steering control of the implement during deceleration. That is, the reduced inertia of the engine 18, inherent with deceleration of the tractor, is utilized to provide a four wheel braking effect for the tractor. By the above action, the front wheel drive is engaged automatically so that without requiring any additional brakes on the front axle 32 and following a braking of the rear axle only, an improved braking performance of the vehicle is achieved by adding an engine braking or resistance caused by the front wheel drive engagement.

The drive system 40 of the present invention further includes logic which automatically shifts the tractor into a four wheel drive condition in response to electrically/hydraulic failure. That is, if either or both electrically energized valves 76, 78 fail for any reason during operation of the tractor, the drive system 40 will automatically default into a four wheel drive mode of operation. Similarly, if the hydraulics associated with de-energization of clutch assembly 34 fails, the normally engaged clutch assembly 34 will act to operate the tractor in a four wheel drive mode of operation. Thus, the drive system of the present invention satisfies both the four wheel assisted braking European requirement for tractors as well as requiring the tractor to default into a four wheel drive mode.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A tractor having a primary pair of wheels driven by a power source and which are brakable by service brakes, a secondary pair of wheels, and a drive system for transferring torque between said primary and secondary pairs of wheels, said drive system comprising:
   a normally engaged clutch assembly between the power source and the secondary pair of wheels;
   brake switches operatively coupled to the service brakes for producing brake signals indicative of the application of the respective service brakes; and
   a control assembly operable to disengage said clutch assembly and which responds to brake signals received from both of said brake switches to automatically regulate engagement of said clutch assembly at a predetermined level sufficient to establish a drive connection between said power source and the secondary pairs of wheels, said predetermined level of regulated clutch engagement being less than full clutch engagement but sufficient to transfer torque at a level which substantially equalizes wheel slippage between the primary and secondary pairs of wheels during braking of the tractor.

2. The tractor according to claim 1 wherein said clutch assembly is operated in a normally engaged condition and is responsive to hydraulic pressure provided thereto, and wherein said control assembly includes hydraulic circuitry for controlling fluid flow to and from said clutch assembly whereby controlling engagement of the clutch and thereby the transfer of power and torque to the secondary pair of wheels.

3. The tractor according to claim 2 wherein said hydraulic circuitry includes a source of pressurized fluid connected to said clutch assembly and valve structure interposed between said fluid source and said clutch assembly for controlling the level of clutch assembly engagement.

4. The tractor according to claim 1 wherein said control assembly includes means for automatically returning the implement to a two wheel mode of operation upon release of the service brakes.

5. A tractor having a primary pair of wheels driven by a power source and which are brakable by service brakes, a secondary pair of wheels, and a drive system for transferring torque between said primary and secondary pairs of wheels, said drive system comprising:
   a clutch assembly arranged between the power source and the secondary pair of wheels, said clutch assembly being normally operated in an engaged condition and is responsive to hydraulic pressure provided thereto;
   brake switches operatively coupled to the service brakes to produce brake signals indicative of the application of the respective service brakes; and
   a control assembly operable to disengage said clutch assembly and which is responsive to brake signals received from said brake switches for automatically establishing a drive connection between said power source and the secondary pairs of wheels upon actuation of the service brakes, said control assembly comprising hydraulic circuitry including a source of pressurized fluid connected to said clutch assembly and a proportional valve assembly operable in response to fluid pressure differentials applied thereagainst for regulating hydraulic fluid pressure operating to engage said clutch assembly at a level less than full clutch engagement but sufficient to transfer power and torque to the secondary pair of wheels to substantially equalize wheel slippage between the primary and secondary pairs of wheels during braking of the tractor.

6. A tractor having a primary axle driven by an engine through a transmission, first and second drive wheels on the primary axle, first and second service brakes for braking the respective first and second drive wheels, a secondary axle having a pair of steering wheels thereon to provide direction for the tractor, and a drive system for selectively transferring torque between said drive wheels and the steering wheels, said drive system comprising:
- a normally engaged clutch assembly between the engine and the secondary axle;
- a brake switch assembly including first and second switches operatively coupled to said first and second service brakes;
- an operator controlled mode switch assembly for selecting a two wheel or a four wheel mode of implement operation as a function of the position of an actuator movable between corresponding two or four wheel mode positions; and
- and electro/hydraulic controller coupled to the brake switch assembly and mode switch assembly for delivering a pressurized fluid flow to effect disengagement of the clutch assembly when the mode switch assembly conditions the tractor for two wheel operation and for automatically establishing a drive connection between the transmission and the second pair of wheels when the first and second service brakes are conjointly actuated, said drive connection being established through controlled interruption of the pressurized fluid flow to said clutch assembly thereby regulating engagement of the clutch assembly to a torque level which substantially equalizes wheel slippage between the first and second pairs of wheels so that steering control of the tractor is maintained during braking of the tractor.

7. The tractor according to claim 6 wherein said controller includes logic which automatically shifts the tractor into four wheel mode of operation in response to electrical/hydraulic failure.

8. The tractor according to claim 6 wherein said controller includes a pump assembly driven by the engine of the tractor and whose output is connected to the clutch assembly through hydraulic circuitry including electro/hydraulic valve structure.

9. The tractor according to claim 8 wherein said electro/hydraulic valve structure includes a solenoid valve interposed between said pump assembly and said clutch assembly for controlling pressurized fluid flow therebetween in response to the position of said actuator on said mode switch assembly.

10. The tractor according to claim 8 wherein said electro/hydraulic valve structure includes a solenoid valve connected to said pump assembly and which regulates pressurized fluid flow to said clutch assembly in response to actuation of said service brakes.

11. The tractor according to claim 8 wherein said electro/hydraulic valve structure includes a proportional valve assembly which is responsive to fluid pressure differentials applied thereagainst and permits full pressurized fluid flow to said clutch assembly when in one position, connects said clutch assembly to exhaust thereby fully engaging the clutch assembly in a second position, and regulates fluid flow to said clutch assembly whereby allowing a predetermined level of torque to be applied through said clutch assembly when positioned between said first and second positions.

12. The tractor according to claim 6 wherein said drive system is responsive to an ON/OFF switch which controls engine operation.

13. An agricultural tractor having a rear axle driven by an engine through a transmission, a pair of rear drive wheels on the rear axle, said drive wheels being of a predetermined diameter, a pair of individually operable service brakes for braking said rear drive wheels, a front axle having a pair of steerable wheels thereon for providing direction to the tractor, said pair of front wheels having a diameter somewhat different than the predetermined diameter of said rear pair of wheels, and a drive system for selectively transferring torque from the rear to the front pair of wheels, said drive system comprising:
- a clutch assembly including a spring biased clutch actuator which normally maintains said clutch assembly in a fully engaged condition for transferring torque from the transmission to the front wheels
- a brake switch assembly including a pair of switches operatively coupled to said pair of service brakes;
- an operator controlled mode switch assembly for conditioning the tractor for two wheel or four wheel operation as a function of the position of an actuator movable between corresponding two and four wheel mode positions: and
- an electro/hydraulic control apparatus including a pressurized fluid source, said control apparatus being operative to deliver a pressurized fluid from said fluid source to act against said clutch actuator whereby fully disengaging the clutch assembly when he actuator of said mode switch assembly is positioned in a two wheel mode position and for automatically establishing a drive connection between the transmission and the front pair of wheels upon actuation of said pair of service brakes, said drive connection being established through controlled interruption of pressurized fluid flow to said clutch assembly thereby regulating clutch assembly engagement such that a braking force applied to the rear wheels by the service brakes is transferred to the front wheels through the transmission thereby improving tractor handling through a period of tractor deceleration.

14. The tractor according to claim 13 wherein said control apparatus further includes a series of electro/hydraulic valves responsive to said pair of service brakes and said mode switch assembly, said control apparatus further including a proportional valve assembly which is responsive to fluid pressure differentials applied thereagainst.

15. The tractor according to claim 13 wherein said drive system further includes means for providing an indication of a two wheel or a four wheel mode of tractor operation.

16. The tractor according to claim 13 wherein said control apparatus includes logic such that the tractor automatically shifts to four wheel mode of operation in response to electrical and/or hydraulic failures.

* * * * *